US005484487A

United States Patent [19]

Motsenbocker

[11] Patent Number: 5,484,487
[45] Date of Patent: Jan. 16, 1996

[54] CLEANSER FOR RELEASING ADHERENT DEPOSITS FROM SURFACES

[76] Inventor: Gregg Motsenbocker, 26142 Walnut Hills Dr., Lake Arrowhead, Calif. 92317

[21] Appl. No.: 414,199

[22] Filed: Mar. 31, 1995

Related U.S. Application Data

[62] Division of Ser. No. 74,887, Jun. 9, 1993, Pat. No. 5,415,800.

[51] Int. Cl.$^6$ .............................. C09D 9/00; C11D 7/26; C11D 7/50
[52] U.S. Cl. .............................. 134/6; 252/143; 252/162; 252/170; 252/171; 252/173; 252/174.19; 252/DIG. 8; 134/38; 134/40
[58] Field of Search .................................... 252/162, 170, 252/171, 173, 143, 174.19, 174.21, DIG. 8; 134/38, 40, 6

[56] References Cited

U.S. PATENT DOCUMENTS

| | | | |
|---|---|---|---|
| 3,607,760 | 9/1971 | McIntyre | 252/104 |
| 4,309,300 | 1/1982 | Danforth et al. | 252/170 |
| 4,465,612 | 8/1984 | Altenschopfler | 252/143 |
| 4,780,235 | 10/1988 | Jackson | 252/170 |
| 4,792,354 | 12/1988 | Matsuo et al. | 106/2 |
| 4,927,556 | 5/1990 | Pokorny | 252/173 |
| 4,934,391 | 6/1990 | Futch et al. | 134/40 |
| 5,084,200 | 1/1992 | Dishart et al. | 252/173 |
| 5,089,164 | 2/1992 | Stanley | 252/171 |
| 5,124,062 | 6/1992 | Stevens | 252/162 |
| 5,183,514 | 2/1993 | Marquis | 134/38 |
| 5,227,085 | 7/1993 | Motsenbocker | 252/99 |
| 5,250,211 | 10/1993 | Motsenbocker | 252/99 |

FOREIGN PATENT DOCUMENTS

| | | | |
|---|---|---|---|
| 4034765 | 5/1992 | Germany | 252/171 |

*Primary Examiner*—Linda Skaling Therkorn
*Attorney, Agent, or Firm*—Donald D. Mon

[57] ABSTRACT

A cleanser for releasing adherent deposits from a surface consisting essentially of ethylene glycol n-butyl ether, acetone, dibasic ester, and optionally water in specified proportions. Also disclosed is a method of releasing adherent deposits from a surface by applying the aforementioned composition to the deposits.

5 Claims, No Drawings

CLEANSER FOR RELEASING ADHERENT DEPOSITS FROM SURFACES

CROSS REFERENCE TO OTHER APPLICATION

This is a division of applicant's U.S. patent application Ser. No. 08/074,887, filed Jun. 9, 1993, now U.S. Pat. No. 5,415,800, entitled "Cleanser for Releasing Adherent Deposits from Surfaces".

FIELD OF THE INVENTION

A biodegradable cleanser which can be extended with water for releasing adherent deposits from porous, non-porous, soft, and delicate surfaces.

BACKGROUND OF THE INVENTION

Removal of paints and paint-like deposits is an old and well-developed art. Generally the objective is to soften the deposit, usually by at least partially dissolving it so that it can be scraped away. The intended effect is usually that of dissolving the material so it becomes fluid. The result is generally a softening of the deposit accompanied by some liquids. The difficulty of pursuing this softened material into cracks and structural intersections is well-known. One response to this problem is to dip the object into a tank of stripper and let it dissolve away.

Not only are these techniques very troublesome, but disposition of the stripper and of its contents is becoming more of an environmental problem. Generally, these strippers use strong organic solvents which, in addition to their disposal problems, constitute a potential health hazard to the user, to the environment, and to the substrate structure.

Despite these inherent problems, because they represent the best materials available, these materials are regularly used on durable, non-porous surfaces that can be regarded as "hard". Examples are the stripping of wood, and the cleansing of metal and enamel surfaces, subject to other problems discussed below.

However, they are not suitable for porous materials such as concrete, concrete block, stucco, cinderblock, rocks and stone, bricks and trees. This is because the dissolved and softened material tends to enter the porous surface, from which it can be removed only partially and then only with great difficulty, and usually with damage to the surface. When the material flows into the pores, later attempts to flush it out can be expected to drive at least some of it deeper. Attempts are sometimes made to overcome this problem by attacking the surface with a strong water jet, often with sandblast grits in it, or by sandblasting. This leaves modified areas which frequently have faint patterns of what was removed.

Soft surfaces, such as vinyls cannot withstand the action of these strippers, or of sandblasts. Neither can many delicate surfaces, for example plexiglass, where the plexiglass will be rendered translucent, rather that transparent.

Further, especially on large exposed areas such as retaining walls and highway signs, if this dissolved material is flushed from the surface, nearby areas will be contaminated by it. As a consequence, organizations such as the California Department of Transportation and many municipal entities simply cover graffiti with a patch of paint, leaving the deposits in place. A trip along many streets and freeways will disclose those patches, whose only merit is that they are less objectionable than what they cover.

Further, even as to enamelled highway signs, where there is no penetration into the sign itself, the action of strippers is slow. While their action could be accelerated by the use of hot water, hot solvents, steam, and sandblasting, highway crews cannot carry along with them such equipment, which often must reach to very inconvenient places. Again, the run-off is itself objectionable, especially after the solvents evaporate.

In an attempt to frustrate graffiti artists, it has become common practice to place a rather expensive layer of plastic material such as 3M 1150 on enamel signs or to impregnate the signs with laminate at the time of manufacture. Unfortunately these respond poorly to solvents applied hot, such as MEK and Kerosene, and even the new citrus-based solvents. Generally these tend to attack the laminations, often delaminating them, resulting in cracking and migration through the plastic to the sign surface. The inherent problem in solvents such as these is that their primary intended effect is to dissolve the adherent material. When quick dissolving of such deposits is intended, it is not surprising that at least some damage will be done to the substrates because of these "hot" solvents.

What is needed, and what this invention provides, is a biodegradable cleanser, which can be extended with water, which works quickly and well at ambient temperatures, which primarily does not dissolve the substances being removed (although in some circumstances some solution may occur), whose effluent is principally a solid that is not itself objectionable, and which can be flushed away with water or wiped up with a cloth, or gathered with a squeegee. For large areas, removal by small volumes of high pressure jets of water will be preferred. All of these methods leave the surface cleansed of the deposit.

It is another object of this invention to provide a method for removing the subject deposits from surfaces, which method produces an effluent that often is agreeably left where it drains next to the surface which was cleansed. It does not itself become a disposal problem. In fact, often it can be swept up, raked up, or simply covered up with dirt. The composition is biodegradable.

It is still another object of this invention to provide a cleanser and a method in which the principal mechanism for removal of the deposit is interruption of its physical bond with the surface, followed primarily by removal of the material in a solid condition. Often it is particulate, but in other circumstances it may form a soft layer which can be gathered up as stated above.

Yet another object of this invention is to provide a more affordable cleanser, both in its inherent cost and in the elimination of damage to cleansed surfaces. Known stripper type compositions tend to use expensive organic solvents, sometimes for their own action, and sometimes as a carrier for other components. They themselves frequently damage the surface to be cleansed. No other carrier can be less expensive than water, which this cleanser can use. Furthermore this invention enables the use of a group of components some of which, if used alone, could frustrate the intended action. For reasons which are presently not fully understood, the combination is more benign, resulting in little or no dissolving of the deposits. Used alone, these components vigorously attack and dissolve paints and paint-like deposits. The combination of ingredients provided by this invention attains the intended results with them, but cause no, or at most minimal, damage to the substrate.

The so-called "green" solvents in general do not work as well as the products of this invention, and are considerably more expensive. While using relatively inexpensive components, the formulations of this invention are safe for the user, safe for the environment, safe for the surface, are biodegradable, and when extended by a carrier, can use water and thereby be water-based.

BRIEF DESCRIPTION OF THE INVENTION

A cleanser according to this invention consists essentially of the following components:

Ethylene glycol n-Butyl Ether (Glycol EB)

Acetone

Dibasic ester (dimethyl adipate, dimethyl glutarate, dimethyl succinate, or a mixture of two or more of them)

Water, if desired.

Glacial acetic acid or phosphoric acid may be substituted for a minor amount of the above formulation for reasons to be disclosed. A thickener may be added to enable the cleanser to reside for a longer time on vertical or steep surfaces, such as street signs and walls. None of these additives when used in minor amounts adversely affects or materially changes the cleansing action of the cleanser as specified.

The invention will be fully understood from the following detailed description.

DETAILED DESCRIPTION OF THE INVENTION

A cleanser according to this invention consists essentially of the following components in the ranges defined, the percentages being in weight relative to the weight of the total formulation in all of the examples given herein:

Glycol EB (ethylene glycol n-butyl ether), between about 5.0% to about 40.0%

Acetone, between about 5.0% to about 40.0%

Dibasic ester (dimethyl adipate, dimethyl glutarate, dimethyl succinate, or a mixture of two or more of them) between about 5.0% to about 40.0%

Water, if used, to make 100%

The preferred formulation for general usage, and the presently preferred embodiment, consists essentially of the following components in the percentages defined:

Glycol EB (ethylene glycol n-butyl ether), about 15.0%

Acetone, about 14.0%

Dibasic ester (dimethyl adipate, dimethyl glutarate, dimethyl succinate, or a mixture of two or more of them), about 16.0%

Water to make 100% (about 55%)

This is a water-based cleanser with applicability to a wide range of applications.

The presently-preferred concentrated formulation, which can be used without dilution by water, and which can later be diluted with water as desired, is as follows:

Ethylene glycol n-butyl ether (Glycol EB)—about 33.3%

Acetone—about 31.1%.

Dibasic ester (as defined above) about 35.5%.

The ingredients are all commercially available. Certain of these are further identified as follows:

Glycol EB (ethylene glycol n-butyl ether) Cas No. 111-76-2

Acetone—Cas No. 67-64-1

Glacial acetic acid—Cas No. 64-19-17

Dibasic ester—a mixture of dimethyl adipate, dimethyl glutarate, and dimethyl succinate, obtainable from Ashland Chemical Inc., of Columbus, Ohio, under its mark DIBASIC ESTER 1. This is a mixture of 66% dimethyl glutarate, (Cas No. 1119-40-0), 17% dimethyl adipate (Cas No. 627-93-0) and 16% dimethyl succinate (Cas No. 106-65-0). The total diester content of this product is 99%.

The water to be used should be de-ionized water, which minimizes cloudiness which might be caused by minerals in untreated water.

Substitution of some of the formulation by glacial acetic acid or phosphoric acid appears to enhance the breakage of the bond between the deposit and the substrate surface, and to decrease any tendency for the deposit to be dissolved. These are optional substitutions.

A suitable thickener If one is to be used, is obtainable from Degusa, under its trademark Aerosil-200, which when used will be added to the above formulation, generally between about 2% and at most 4% of the total formulation weight. A thickener will be added when the formulation is to be used on a surface which is so steep that a less viscous product would flow off of the substrate too quickly, such as from a wall or a vertical sign. However, as a commercial matter, a thickener will actually be added to all formulations to facilitate its use in all applications.

The percentages for the formulation itself are given without any of the above optional additives. When these or any of them are used, they are substituted for an equal amount of the total formulation as defined, and they have no deleterious effect on the action of the formulation for its cleansing function.

This invention is primarily directed toward the removal of adherent layers of certain kinds of adherent deposits from many kinds of substrate surfaces, Among these are the following:

Street signs and freeway signs, such as reflectively silk screened, high intensity surfaces, and surfaces coated with protective materials, concrete, cinderblock, cement, slumpstone, mountain rocks and split rocks, stucco, formica, glass, iron work, steel, stainless steel, aluminum, and other metals and alloys, brick—glazed and unglazed, vinyl, and trees. Plastic, for example, plexiglass and fiberglass. Wood, especially denser woods, tile glazed and unglazed, linoleum, clothing and fabrics generally, carpets, wallpaper removal and blackboards and dry mark boards.

This list is not intended to be exhaustive, but instead to be illustrative of the wide range of utility of this invention.

The following are some examples of what are hereafter referred to as an "adherent deposits":

Oil lacquers, water-based lacquers, high-gloss acrylics, acrylic enamels, enamel semi-gloss, flat-based paints, water-based enamels, urethane enamels, permanent markers, super enamels, Speed-E-Namels, primers, varnish, wood stains, high-liter inks, correction fluid, all aerosol paints, and wallpaper adhesives.

This list is not intended to be exhaustive, but instead to be illustrative of the wide range of utility of this invention. Adherent deposits are characterized by their formation of an adherent layer which, when dried, cured or hardened, is attached to the substrate by a physical bond which it is the purpose of this cleanser to eliminate, or at least to reduce it to the extent that the layer can physically be removed. The marker and Hi-Liter inks, while they do not form this type of deposit, still appear to be removed by this composition by some mechanism from non-porous substrates, without smearing. For this reason, they are included in the list.

The action of this cleanser is instructive to observe. It is applied to the deposit. Left for only a short time, usually for less than one minute, the cleanser will have penetrated the deposit. Then a perceptible release of the deposit from its substrate surface begins to be observed. Occasionally, the deposit will loosen in platelets. Left to work for a bit longer, the deposit divides itself into very small fragments. About three minutes is about the preferred residence time on porous surfaces. For non-porous, soft and delicate surfaces, a shorten time is required. Interestingly, there appears to be little or no solution of the deposit. Observation of the liquid cleanser after the action has occurred shows little if any evidence of solution, for example by transfer of colored material into solution. If placed in water, the water will remain essentially uncolored.

Significantly, an advantage of this invention is its quick action. A thickener, while it usually will be used, will be needed only when the surfaces are so steep that there would be insufficient residence time before it drained away, and also to confine it to the surface intended to be cleansed. Advantage should be taken of the quick action of this invention, which is one of its most desirable features.

The importance of this action, for example along highways, is that the deposits when washed from the surfaces can drain onto the ground as entrained material in a low volume stream of water. This effluent can be allowed to flow away, or can be washed away, or can be left on the ground where the entrained material can be covered, swept up, or raked up. Often this material is so ineffusive that it can simply be ignored, because it is inconsequential in size and bulk. The total volume is only that of the deposit which was removed, and it has not been extended by solution mechanisms. The substrate surface is left clean. When the deposit was removed, it was not removed in a form that penetrated the surface, such as by a solution or an emulsion, but rather as a suspension to be carried away by a stream of water, or even wiped up.

An action of this kind has not previously been observed or known to exist by the Inventor herein. It is obtained by the formulation of this cleanser by means of a mechanism not fully understood by him, and its very nature is a matter of some speculation, but whatever the mechanism is, the result is as described. It appears to be the result of an interruption of the bond which held the deposit to the surface. Frequently, if the deposit is not removed, and the cleanser is allowed to evaporate, the deposit returns nearly to its previously adherent condition.

The components of this formulation have been used in other cleanser formulations, but in them their intended objectives appear to have been as solvents. For example, dibasic esters are notable for their ability to soften and dissolve substances of interest to this invention, and that is the very problem with their use in the applications intended for this cleanser. A review of their utility as evidenced by prior publications attests to the fact that their effect is to substitute one mess for another. However, their resulting mess is one which cannot entirely be removed from porous surfaces, and also which involves the disposal problems discussed above.

Similarly, Glycol EB and acetone are principally found in formulations where a surface coating is to be dissolved.

It is surprising that a combination of components which individually are classically directed to reducing a deposit to a solution or to a sludge, can be combined to form a composition which enables the adherent deposit to be removed freely from its substrate surface.

As illustrative examples, most or all of the adherent deposits of concern herein are quickly dissolved in a suitable aqueous solution of the dibasic esters. The addition of acetone does not appear to repress this action. An aqueous solution of acetone is an efficient solvent. The addition of dibasic esters results in the solvent action described above. Similar comments apply to the Glycol EB.

The preferred formulation is the most effective one which the inventor has been able to devise. Any composition which departs from the preferred formulation but in which the components are still within the defined ranges, generally displays a lesser efficiency, and in some circumstances a tendency to soften the deposits, but still provides the advantages of this invention to an important extent.

The reasons for the synergy of the components are not understood, but their consequence is an effective and environmentally benign cleanser and environmentally benign effluent after application of the cleanser.

After a brief residence on the deposit, the cleanser and the loosened deposit, can be flushed, wiped, or scraped away. A reasonably strong stream of water is effective for this purpose. However, in many situations water will be in short supply, and also it is advantageous to reduce the total amount of effluent, so as to reduce the area over which it might flow.

A high-pressure water jet stream will be more effective in removing the particulate material from non-painted porous substrates such as concrete, stucco, stone, or brick. Such a stream will usually be needed only for such substrates. Only a surprisingly small volume of water is needed, which can be carried in a pressure tank which may be so small as to be carried by the workman. There is a wide range of devices for this purpose sold on the market. However, for producing a low volume, high pressure jet spray, the inventor herein has found the conventional "airless" paint gun sprayer to be superior. Many examples of this type of sprayer are available on the market. It can discharge water in an even fan spray at a high velocity. One suitable gun delivers a 4 inch wide fan-shaped jet spray of water up to 3,000 psi. This is very effective, and is a high velocity, low volume jet of water. It successfully blows off the deposits, and provides enough water for them to be washed away without requiring excessive water for the purpose. Supplementary washing can be provided, but will rarely be needed.

For reasons not understood by the inventor, some stains, markers, and High-Lighters, varnishes, lacquers, stains such as wood stains, can also be removed but not from porous substrates. These do not appear to come away as solids, but to a reasonable degree they will be removed from surfaces such as plexiglass and vinyl. Water based adhesives used for hanging wallpaper are also released. The wallpaper's condition is unimportant. The importance is its release.

This product will preferably be sold with water in it as specified above, because this is a stable, clear mixture readily useable without further care. There are, however, applications where water would more advantageously be added later. Adding it to a container of water, or adding water to it at or near the point of use or sale may in some instances be more convenient, and more economical to ship than carrying the entire pre-mixed product to the point of use.

Also, although it ordinarily will not be preferred, the concentrated formulation can be used without dilution. However, the action of the concentrate is not as effective as the formulation with water in it. It appears that some of the components may preferentially evaporate, leaving the others in a concentration which may more vigorously attack the deposit, sometimes dissolving it. Still, it can be used directly and is useful if used with more care than need be given to a water containing cleanser. Generally, at least about 20% by weight of the formulation will be water, in order to provide a product with widespread utility.

This invention is not to be limited by the embodiments described in the description, which are given by way of example and not of limitation, but only in accordance with the scope of the appended claims.

I claim:

1. A method of releasing adherent deposits from a surface comprising:

a. applying to an adherent deposit on a surface an environmentally safe cleanser consisting essentially of the following components, whose percentages are expressed relative to the total weight of these components without including other materials that might be included in minor amounts which do not interfere with the intended action of the cleanser:

Ethylene glycol n-Butyl Ether (Glycol EB), between about 5.0% and about 40.0%;

Acetone, between about 5.0% and about 40.0%; and

Dibasic ester selected from the group consisting of dimethyl adipate, dimethyl glutarate and dimethyl succinate, and mixtures of any two or more of them, between about 5.0% and about 40.0%; and optionally water to make 100%; and b. permitting said cleanser to contact said deposit for a time sufficient to release said deposit from said surface; and c. removing said released deposit from said surface.

2. A method according to claim 1 in which a stream of water directed against said released deposits to remove them.

3. A method according to claim 2 in which said stream of water is produced by an "airless" paint gun.

4. A method according to claim 1 in which the released deposit is physically removed.

5. A method according claim 4 in which the released deposit is removed by wiping.

* * * * *